United States Patent [19]
Whiteside

[11] Patent Number: 6,142,178
[45] Date of Patent: Nov. 7, 2000

[54] TRAP SEAL PRIMER DISTRIBUTION UNIT

[75] Inventor: Michael J. Whiteside, Toronto, Canada

[73] Assignee: MIFAB, Inc., Detroit, Mich.

[21] Appl. No.: 09/397,596

[22] Filed: Sep. 16, 1999

Related U.S. Application Data

[60] Provisional application No. 60/132,211, May 3, 1999.
[51] Int. Cl.[7] ..................................................... F16K 11/02
[52] U.S. Cl. ...................................... 137/561 A; 137/270
[58] Field of Search ................................ 137/270, 561 A, 137/625.46, 861

[56] References Cited

U.S. PATENT DOCUMENTS

| 3,323,540 | 6/1967 | Holton | 137/270 |
| 3,863,675 | 2/1975 | Wiltshire | 137/624.27 |
| 4,497,337 | 2/1985 | Mosbrucker | 137/247.25 |
| 4,549,567 | 10/1985 | Horton | 137/262 |

*Primary Examiner*—John Fox
*Attorney, Agent, or Firm*—Hodgson, Russ, Andrews, Woods & Goodyear, LLP

[57] ABSTRACT

A trap seal primer distribution unit capable of providing charges of water to two, three, or four sewer trap lines depending on the initial setting of the unit. The distribution unit comprises two main components. A lid for splitting the water from the trap seal primer valve removably attaches to a distribution body such that rotation of the lid into three alternate positions enables the distribution unit to alternately serve two, three, or four sewer trap lines.

6 Claims, 5 Drawing Sheets

TRAP SEAL PRIMER DISTRIBUTION UNIT

CROSS-REFERENCE TO RELATED APPLICATION

Applicant hereby claims priority based on Provisional Application No. 60/132,211 filed May 3, 1999, and entitled "Trap Seal Primer Distribution Unit," which is incorporated herein by reference.

FIELD OF INVENTION

The present invention relates to a distribution unit to enable a single trap seal primer valve to serve several sewer line water traps.

BACKGROUND OF THE INVENTION

Trap seal primer valves are used for charging water into sewer line water traps to prevent the escape of sewer gases. Under normal conditions, the level of water in sewer line traps decreases through evaporation by about one-eighth of an inch for each twenty-four hour period. Accordingly, most municipal plumbing and sanitary codes require that means be provided for supplying water to the traps automatically or periodically to assure that the trap water level will be sufficiently high to render the trap operative and functional at all times.

To supply water to the traps automatically, it is usual to connect the trap to the house water line through a priming valve that is actuated by variations in pressure in the house line and acts to charge the trap with water upon each fluctuation of pressure in the house line.

A single trap seal primer can serve multiple sewer trap lines. There have been systems that include manifolds that require precise leveling in order to uniformly distribute water to a plurality of water conduits plumbed, for example, to floor drain traps. These systems include channeled water stream splitters that attempt to divide a water stream exiting from a trap seal primer. There have been problems with maintaining flow to all of the conduits because of the shape of the water stream exiting the trap seal primer valve, the amount of leveling needed in some of the prior systems, and from irregular shaped components of the prior systems. What is needed is a distribution system that will uniformly divide water from a trap seal primer valve into two, three, or four equal parts independent of leveling or line pressure fluctuations.

SUMMARY OF THE INVENTION

The present invention meets the above-described need by providing a distribution unit capable of providing charges of water to two, three, or four sewer trap lines depending on the initial setting of the unit. The distribution unit comprises two main components. First, a lid for splitting the water from the trap seal primer valve has a cylindrical chamber having male pipe thread connections on the outside for attachment to a trap seal primer valve. The chamber is disposed substantially perpendicular from a disc-shaped member at the opposite end. The end of the chamber includes a first opening disposed inside an end surface having a seal ring formed therein. Inside the chamber, the first opening leads to four uniform inlet orifices that flow into four gravity channels inside the chamber that are directed at ninety degree opposite downward directions. The gravity channels terminate in exit orifices positioned at the opposite end of the lid.

The lid also has four apertures disposed about the perimeter of the disc-shaped member to prevent the backflow from reaching the potable water supply. Also, the lid has three apertures for removably attaching the lid to the distribution body by inserting fasteners that connect the lid to the distribution body in three alternate positions.

The distribution body is the second main component of the distribution unit, and the distribution body is preferably molded from plastic with four insert-molded brass nipple plumbing connections. Each of the plumbing connections can be connected to a separate sewer trap line for distribution of the water charges to the trap lines. The distribution body is substantially cylindrical and preferably has four openings on one end for attachment of the nipples.

The opposite end of the body is open and forms a cylindrical open chamber. A set of dividing walls divide the open chamber into quadrants. The dividing walls are capable of aligning with the exit orifices on the lid such that individual dividing walls can prevent the flow of water from the exit orifices into the body of the distribution unit. An indicator mark on the top rim of the body provides a guide for positioning the lid on the distribution body in one of three positions. The settings for the distribution unit indicate whether the lid is set up for two, three, or four trap lines. The position of the lid determines the number of quadrants that can be fed with water. When the lid is rotated, the dividing walls move in an out of alignment with the exit orifices on the lid such that at some points of rotation some of the orifices are open and some are blocked.

In operation, when water is received by the distribution unit from the trap seal primer valve, a momentary pressure rise occurs in the opening in the chamber. The water is uniformly divided into the four gravity channels due to the highly uniform inlet orifices at the top of the chamber. If a channel is positioned over a dividing wall, the flow is prevented from entering the distribution body through that channel.

The present invention offers several advantages including eliminating the need for conduit systems that require precise leveling in order for a single trap primer valve to serve several sewer trap lines. Also, the distribution unit is compact and therefore easier to install.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENTS

Figure 1:
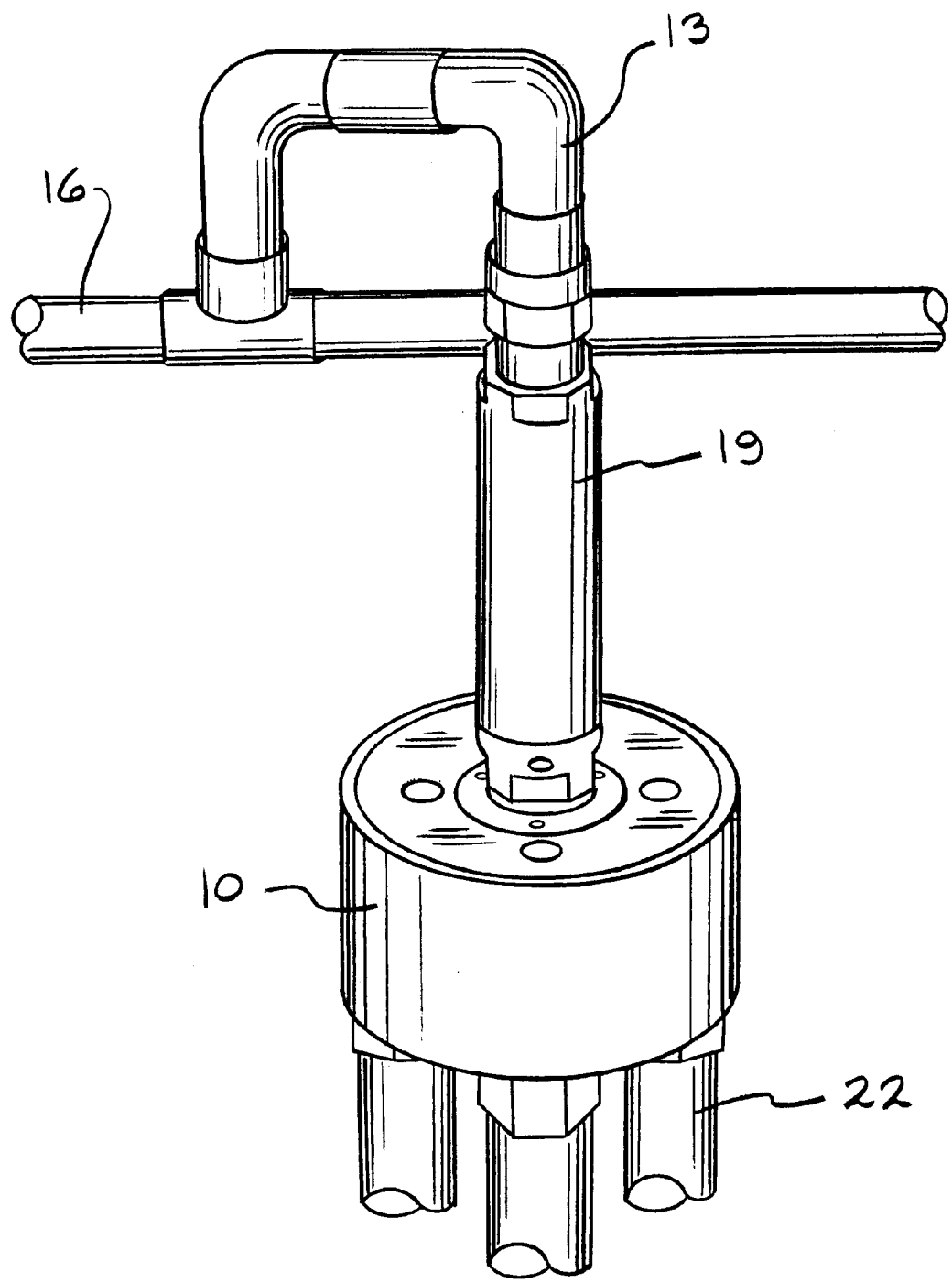
FIG. 1 is a schematic diagram illustrating the manner of installation of the trap seal primer distribution unit of the present invention.

As shown in FIG. 1, the seal trap primer distribution unit 10 of the present invention is adapted for insertion into a pressurized water line 13 that interconnects the house water line 16 to a trap seal primer valve 19 and sewer trap lines 22. The function of the trap seal primer valve 19 is to keep the sewer trap charged with water so that there is no possibility of the escape of sewer gas. As known to those of ordinary skill in the art, the trap seal primer valve 19 responds to pressure fluctuations in the house water line 16 to provide a charge of water to the sewer trap lines 22.

Figure 2:
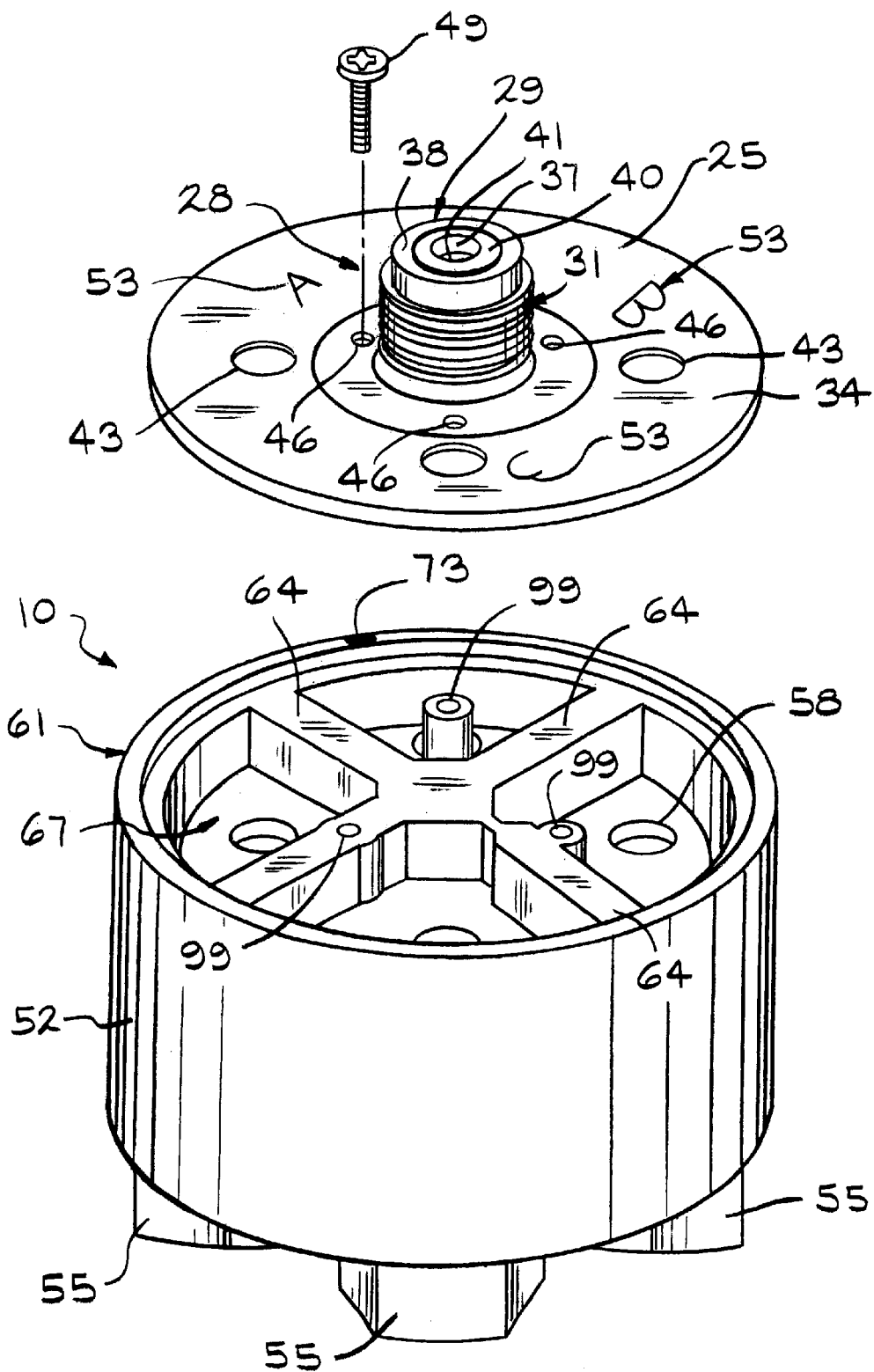
FIG. 2 is a perspective exploded view of the top of the trap seal primer distribution unit.

Turning to FIG. 2, the distribution unit 10 comprises two main components. First, a lid 25 for splitting the water from the trap seal primer valve 19 has a cylindrical chamber 28 having male pipe thread connections 31 on the outside for attachment to the trap seal primer valve 19. The end 29 of the chamber 28 includes a first opening 37 disposed inside an end surface 38 having a seal ring 40 formed thereon. The first opening 37 leads to a cylindrical pressure cavity 41 with inlet orifices 79 disposed at the bottom. The chamber 28 is disposed substantially perpendicular from a disc-shaped member 34 at the opposite end. The lid 25 is preferably constructed of a molded transparent plastic material.

The disc-shaped member 34 has four apertures 43 disposed about the perimeter of the disc-shaped member 34 to prevent backflow from reaching the potable water supply. Also, the lid 25 has three apertures 46 for inserting fasteners 49 that connect the lid 25 to a distribution body 52 in three positions. Each of the apertures 46 has an indicia 53 disposed adjacent thereto. The purpose of the indicia 53 will become apparent hereafter. The distribution body 52 is the second main component of the distribution unit 10.

The distribution body 52 is preferably molded from plastic with four insert-molded brass nipple plumbing connections 55. Each of the plumbing connections 55 can be connected to separate sewer trap lines 22 for distribution of the water charges to the trap lines 22. The distribution body 52 is substantially cylindrical and has four openings 58 on one end for attachment of the nipple plumbing connections 55.

The opposite end of the body is open and forms a cylindrical open chamber 61. A set of dividing walls 64 divide the open chamber 61 into quadrants 67. The dividing walls 64 are capable of aligning with exit orifices 70 (shown in FIG. 3) on the lid 25 such that individual dividing walls 64 can prevent the flow of water from the exit orifices 70 into the body of the distribution unit 10. A guide marker 73 on the top rim of the body provides a guide for positioning the lid 25 on the distribution body 52 in one of three positions. The settings for the distribution unit 10 indicate whether the lid 25 is set up for two, three, or four trap lines. The position of the lid 25 determines the number of quadrants 67 that can be fed with water. When the lid 25 is rotated, the dividing walls 64 move in and out of alignment with the exit orifices 70 such that some of the orifices 70 are open and some are blocked.

Figure 3:
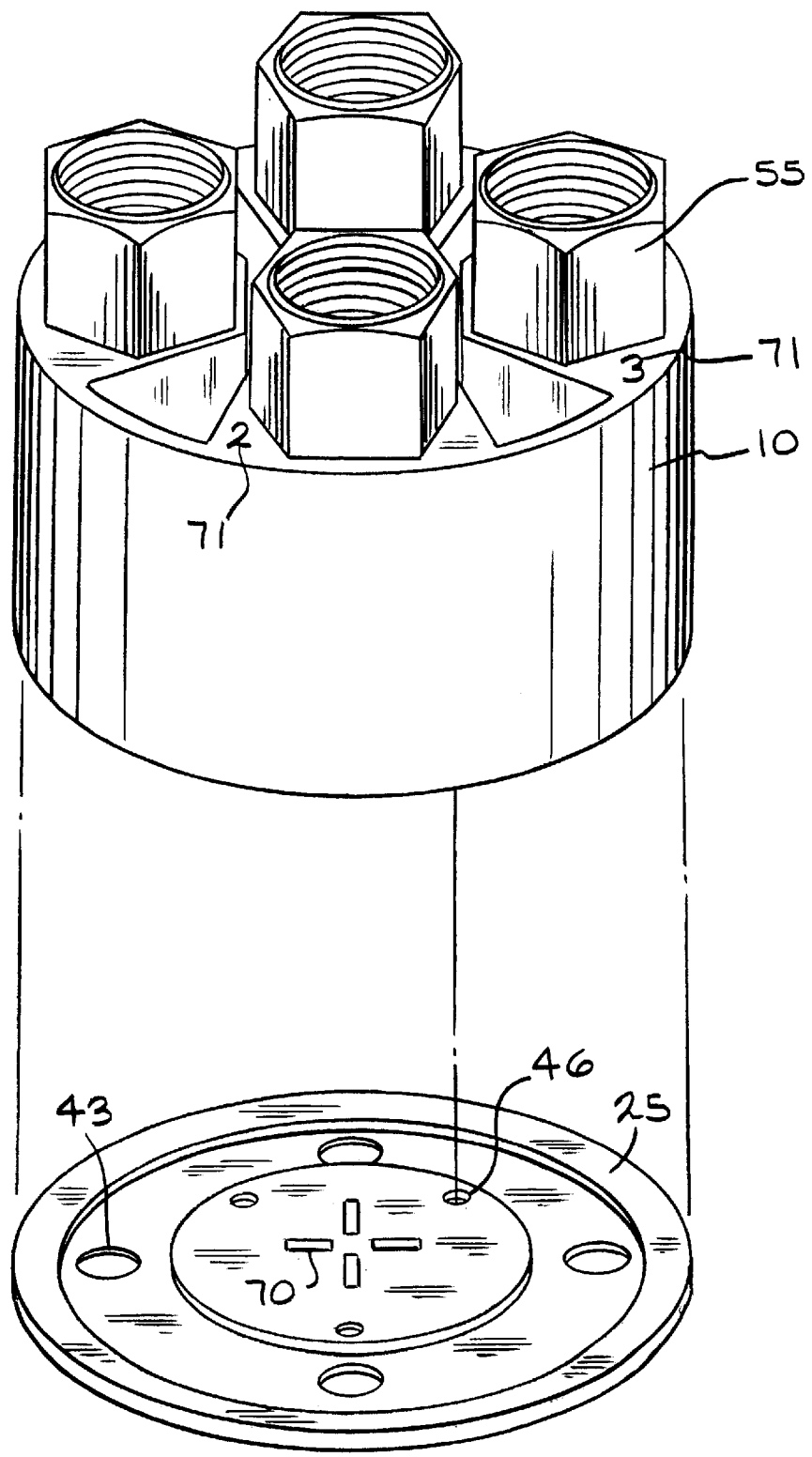
FIG. 3 is a perspective exploded view of the bottom of the trap seal primer distribution unit.

Turning to FIG. 3, the exit orifices 70 are oriented at approximately ninety degree intervals from each other on the inside of the lid 25. Each quadrant 67 is identified by a numerical designation 71 adjacent to the plumbing connection 55.

Figure 4:
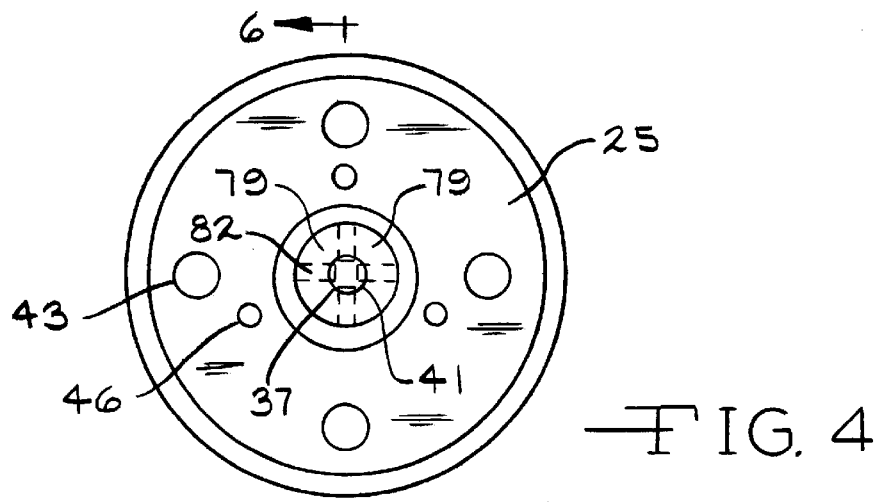
FIG. 4 is a top plan view of the distribution unit of the present invention.

As shown in FIG. 4, a set of inlet orifices 79 are disposed at the bottom of the cylindrical pressure cavity 41 bordered by the opening 37. A plurality of gravity channels 82 extend through the chamber 28 between the inlet orifices 79 and the outlet orifices 70. The channels 82 are substantially rectangular, however, the walls of the cylindrical pressure cavity cover a portion of the top opening of the channels 82. The channels 82 are directed at ninety degree opposite downward directions.

Figure 5:
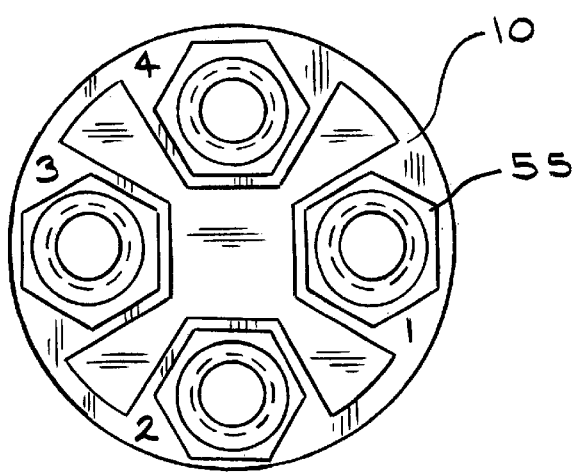
FIG. 5 is a bottom plan view of the bottom of the distribution unit.

In FIG. 5, the bottom of the distribution body 52 is shown. The insert-molded nipple plumbing connections 55 are preferably constructed of brass. Numerical designations 71 mark the position of the quadrants 67.

Figure 6:
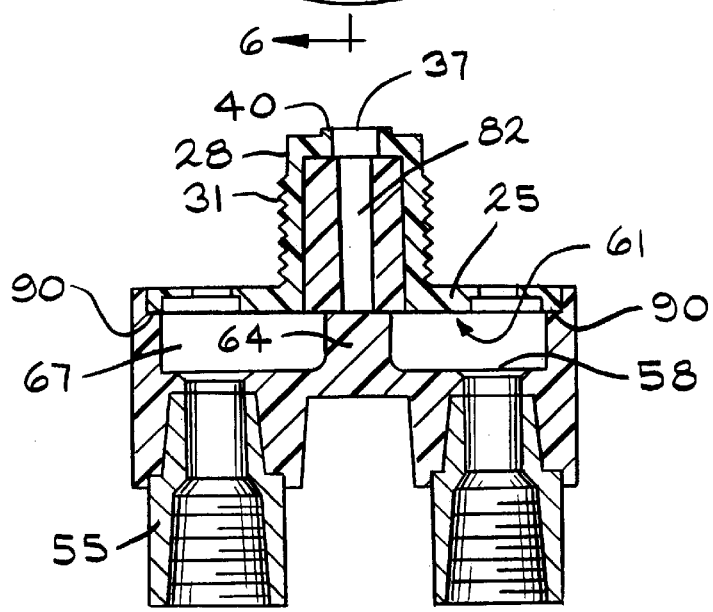
FIG. 6 is a sectional side elevational view of the distribution unit taken along lines 6—6 in FIG. 4; and, FIG. 7 is a top plan view of the body of the distribution unit.

Turning to FIG. 6, the lid 25 fits inside the distribution body 52 and rests on a ledge 90 formed inside the opening. The open chamber 61 is divided by the dividing walls 64 to form compartments which in this case are named quadrants 67. The chamber 28 has a threaded outer surface for engaging with the trap seal primer valve 19.

Figure 7:
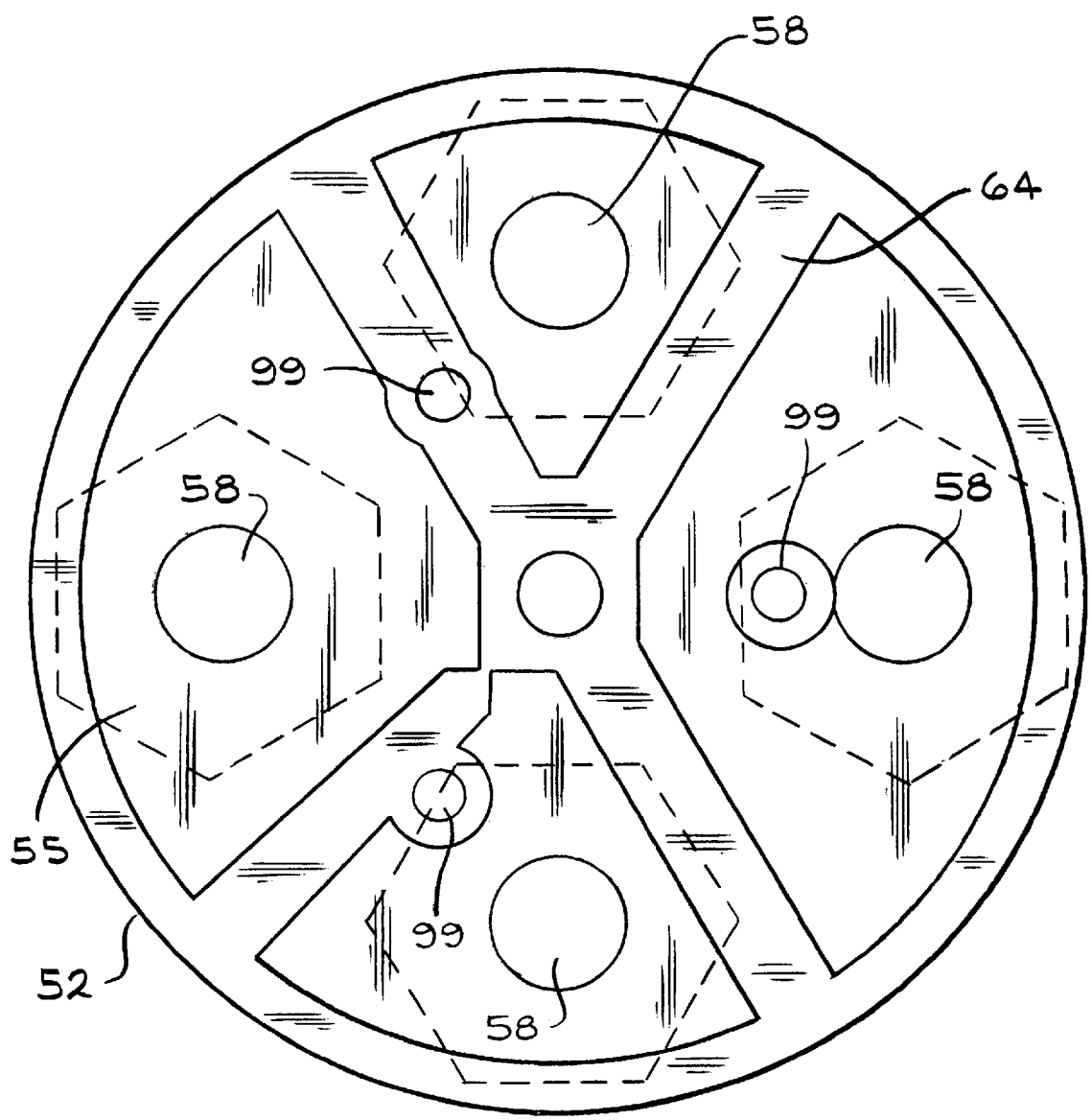

In FIG. 7, a plurality of threaded openings 99 engage with the fasteners 49 that removably attach the lid 25 to the distribution body 52.

In operation, by rotating the lid 25 in approximately one-hundred twenty degree intervals, the configuration of the lid 25 can be changed between three settings. In the first setting the dividing walls block two of the exit orifices 70 such that two of the quadrants 67 are provided with a charge of water. This configuration is suitable for providing charges of water to two trap lines. In order to switch to another configuration, the fasteners 49 would be removed from the openings 99 and the lid would be rotated approximately sixty degrees. In the next configuration, the exit orifices 70 would align with the dividing walls 64 in a different manner such as to permit water flow to three or four quadrants 67. The correct position of the lid 25 is determined by matching up the indicia 53 (FIG. 2) with the guide marker 73 (FIG. 2). In a preferred embodiment and by way of example only, when the letter A and the guide marker 73 are aligned, only the ports marked 1 and 3 will distribute water equally. When the letter B and the guide marker 73 are aligned, only the ports marked 1,2, and 3 will distribute water equally. When the letter C and the guide marker 73 are aligned all of the ports will distribute water equally.

When water is received by the distribution unit 10 from the trap seal primer valve 19, a momentary pressure rise occurs in the opening 37 in the chamber. Due to the pressure increase, calcium and other deposits do not have the opportunity of accumulating, and thus, do not affect the functioning of the distribution unit 10. The water is uniformly divided into the four gravity channels 82 due to the highly uniform inlet orifices 79 at the top of the chamber 28. If a channel 82 is positioned such that the exit orifice 70 is positioned over a dividing wall 64, the flow is prevented from entering the distribution body 52. In this manner the distribution unit 10 can be set up to provide charges of water to between two and four sewer trap lines.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A distribution unit, comprising:

a) a distribution body having a plurality of openings extending therethrough, the openings surrounded on a first side of the distribution body by a plurality of dividing walls;

b) an inlet member disposed on the distribution body, the inlet member having a plurality of entry orifices, a plurality of exit orifices, and a plurality of gravity channels connecting each entry orifice to a corresponding exit orifice, the inlet member capable of rotating relative to the distribution unit to bring at least one of the exit orifices into alignment with the dividing walls such that flow from the exit orifice is blocked.

2. The distribution unit of claim 1, wherein the plurality of compartments are disposed inside a cylindrical chamber.

3. The distribution unit of claim 1, wherein the inlet member is attached to a flange, the flange enclosing the compartments.

4. The distribution unit of claim 3, wherein the flange comprises a disc-shaped member having a plurality of apertures disposed therein.

5. The distribution unit of claim 1, wherein the exit orifices are disposed at an angle of approximately ninety degrees from each adjacent exit orifice.

6. The distribution unit of claim 5, wherein the inlet member is capable of being rotated into at least three positions, a first position where two of the exit orifices align with the dividing walls such that the two exit orifices are blocked by the walls, a second position where one of the exit orifices aligns with one of the walls, and a third position where none of the exit orifices align with the walls.

* * * * *